(12) United States Patent  
Henderson et al.

(10) Patent No.: US 12,483,912 B2
(45) Date of Patent: Nov. 25, 2025

(54) ESTIMATING SIGNAL PROPAGATION BASED ON SAMPLING BY USER EQUIPMENT IN IDLE MODE

(71) Applicants: AT&T INTELLECTUAL PROPERTY I, L.P., Atlanta, GA (US); AT&T INTELLECTUAL PROPERTY II, L.P., Atlanta, GA (US); AT&T TECHNICAL SERVICES COMPANY, INC., Vienna, VA (US); AT&T Mobility II LLC, Atlanta, GA (US)

(72) Inventors: Thomas Henderson, Alpharetta, GA (US); Kurt Huber, Ashburn, VA (US); Daniel Vivanco, Ashburn, VA (US); Julius Fodje, Alpharetta, GA (US)

(73) Assignees: AT&T Intellectual Property I, L.P., Atlanta, GA (US); AT&T Intellectual Property II, L.P., Atlanta, GA (US); AT&T Technical Services Company, Inc., Vienna, VA (US); AT&T Mobility II LLC, Atlanta, GA (US)

( * ) Notice: Subject to any disclaimer, the term of this patent is extended or adjusted under 35 U.S.C. 154(b) by 678 days.

(21) Appl. No.: 17/829,199

(22) Filed: May 31, 2022

(65) Prior Publication Data

US 2023/0388828 A1    Nov. 30, 2023

(51) Int. Cl.
   *H04W 24/08*  (2009.01)
   *H04W 60/04*  (2009.01)
(52) U.S. Cl.
   CPC ........... *H04W 24/08* (2013.01); *H04W 60/04* (2013.01)

(58) Field of Classification Search
   CPC ............................ H04W 24/08; H04W 60/045
   See application file for complete search history.

(56) References Cited

U.S. PATENT DOCUMENTS

| | | | |
|---|---|---|---|
| 2014/0112178 A1* | 4/2014 | Gunnarsson | H04W 24/08 370/252 |
| 2020/0205019 A1* | 6/2020 | Guha | H04L 67/303 |
| 2022/0159440 A1* | 5/2022 | Chen | H04W 4/90 |
| 2023/0388939 A1* | 11/2023 | Huber | H04W 52/285 |
| 2023/0413303 A1* | 12/2023 | Vivanco | H04W 72/56 |
| 2024/0007963 A1* | 1/2024 | Ng Molina | H04W 52/24 |
| 2025/0031066 A1* | 1/2025 | Moosavi | H04L 41/16 |

FOREIGN PATENT DOCUMENTS

CN         1764310 A  *  4/2006

* cited by examiner

*Primary Examiner* — Angelica Perez

(57) ABSTRACT

The technologies described herein are generally directed to mapping signal propagation using idle mode user equipment in a fifth generation (5G) network or other next generation networks. An example method can include, facilitating receiving, a message from a user equipment, with the message including signal information describing detection of a signal of a carrier of base station equipment while the user equipment was in an idle mode at a first location. The method can further include identifying a second location of the base station equipment corresponding to a time when the signal was transmitted, wherein the second location is different from the first location. Further, the method can include based on the first location, the second location, and the signal information, estimating a path loss of the carrier at the first location.

20 Claims, 12 Drawing Sheets

MOBILITY UPDATE MESSAGE ADDENDUM 710

- FREQUENCY OF SIGNAL IDENTIFIED 720A
- POWER LEVEL OF SIGNAL IDENTIFIED 720B
- UE CALCULATED PATHLOSS 720C
- LOCATION OF UE AT SAMPLE COLLECTION 720D
- CURRENT LOCATION 720E
- EFFECTIVE ISOTROPIC RADIATED POWER (EIRP) 720F
- EVOLVED UNIVERSAL TERRESTRIAL RADIO ACCESS NETWORK (E-UTRAN) CELL GLOBAL IDENTIFIER (ECGI) OF CELL 720G
- PHYSICAL CELL IDENTIFIER (PCI) 720H
- CURRENT FREQUENCY OF CARRIER MEASURED 720I
- REFERENCE SIGNAL RECEIVED POWER (RSRP) OF SERVING CELL, BEAM ID 720J
- IDLE CHANNEL MEASUREMENTS FROM THE PHONE 720K
- POWER ALLOCATION SETTING OF UE 720L
- MODEL OF UE 720M

FIG. 7

ESTIMATING SIGNAL PROPAGATION BASED ON SAMPLING BY USER EQUIPMENT IN IDLE MODE

TECHNICAL FIELD

The subject application is related to different approaches to handling communication in networked computer systems and, for example, to using information from network equipment in idle and active states to improve signal propagation.

BACKGROUND

As demands for fast, high-quality wide area network connections have increased, wireless providers have implemented many new technologies, each having advantages and drawbacks over traditional approaches. New, shorter wavelength frequency bands can provide dramatically faster broadband connections to mobile devices, but because these bands can be blocked easier and have narrower beams, positioning them to offer service to user devices has been challenging.

In this environment, it can be important to measure signal propagation and path loss for different locations within the network and for these measurements to be updated periodically.

BRIEF DESCRIPTION OF THE DRAWINGS

The technology described herein is illustrated by way of example and not limited in the accompanying figures in which like reference numerals indicate similar elements and in which:

FIG. 7 is a diagram of a non-limiting example addendum to administrative messages that can provide additional antenna resource allocating information, in accordance with one or more embodiments.

DETAILED DESCRIPTION

Figure 1:
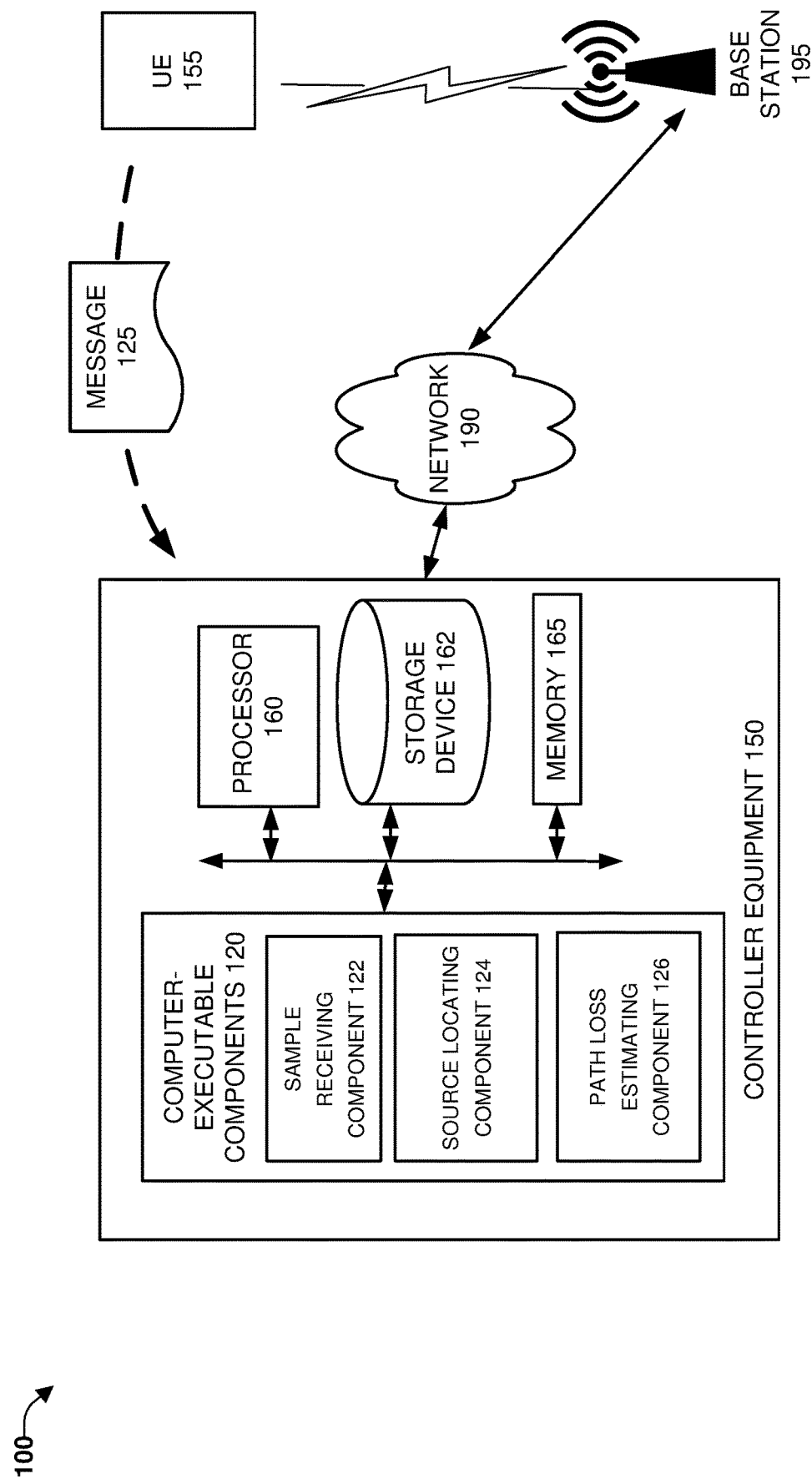
FIG. 1 is an architecture diagram of an example system that can facilitate mapping signal propagation using idle user equipment, in accordance with one or more embodiments.

Generally speaking, one or more embodiments can facilitate mapping signal propagation between base station equipment and user equipment while the user equipment is in an idle mode. In addition, one or more embodiments described herein can be directed towards a multi-connectivity framework that supports the operation of new radio (NR, sometimes referred to as 5G). As will be understood, one or more embodiments can support control and mobility functionality on cellular links (e.g., long term evolution (LTE) or NR). One or more embodiments can provide benefits including, system robustness, reduced overhead, and global resource management.

It should be understood that any of the examples and terms used herein are non-limiting. For instance, while examples are generally directed to non-standalone operation where the NR backhaul links are operating on millimeter wave (mmWave) bands and the control plane links are operating on sub-6 GHz long term evolution (LTE) bands, it should be understood that it is straightforward to extend the technology described herein to scenarios in which the sub-6 GHz anchor carrier providing control plane functionality could also be based on NR. As such, any of the examples herein are non-limiting examples, any of the embodiments, aspects, concepts, structures, functionalities or examples described herein are non-limiting, and the technology may be used in various ways that provide benefits and advantages in radio communications in general.

In some embodiments the non-limiting terms "signal propagation equipment" or simply "propagation equipment," "radio network node" or simply "network node," "radio network device," "network device," and access elements can be used herein. These terms may be used interchangeably, and refer to any type of network node that can serve user equipment and/or be connected to other network node or network element or any radio node from where user equipment can receive a signal. Examples of radio network node include, but are not limited to, base stations (BS), multi-standard radio (MSR) nodes such as MSR BS, gNodeB, eNode B, network controllers, radio network controllers (RNC), base station controllers (BSC), relay, donor node controlling relay, base transceiver stations (BTS), access points (AP), transmission points, transmission nodes, remote radio units (RRU) (also termed radio units herein), remote ratio heads (RRH), and nodes in distributed antenna system (DAS). Additional types of nodes are also discussed with embodiments below, e.g., donor node equipment and relay node equipment, an example use of these being in a network with an integrated access backhaul network topology.

In some embodiments, the non-limiting term user equipment (UE) is used. This term can refer to any type of wireless device that can communicate with a radio network node in a cellular or mobile communication system. Examples of UEs include, but are not limited to, a target device, device to device (D2D) user equipment, machine type user equipment, user equipment capable of machine to machine (M2M) communication, PDAs, tablets, mobile terminals, smart phones, laptop embedded equipped (LEE), laptop mounted equipment (LME), USB dongles, and other equipment that can have similar connectivity. Example UEs are described further with FIGS. 9 and 10 below. Some embodiments are described in particular for 5G new radio systems. The embodiments are however applicable to any radio access technology (RAT) or multi-RAT system where the UEs operate using multiple carriers, e.g., LTE. Some embodiments are described in particular for 5G new radio systems. The embodiments are however applicable to any RAT or multi-RAT system where the UEs operate using multiple carriers, e.g., LTE.

The computer processing systems, computer-implemented methods, apparatus and/or computer program products described herein employ hardware and/or software to solve problems that are highly technical in nature (e.g., estimating location of a UE from signal propagation information and allocating antenna resources), that are not abstract and cannot be performed as a set of mental acts by a human. For example, a human, or even a plurality of humans, cannot efficiently predict a location of a user equipment and rapidly direct multiple signals thereto (which generally cannot be performed manually by a human), with the same level of accuracy and/or efficiency as the various embodiments described herein.

Aspects of the subject disclosure will now be described more fully hereinafter with reference to the accompanying drawings in which example components, graphs and selected operations are shown. In the following description, for purposes of explanation, numerous specific details are set forth in order to provide a thorough understanding of the various embodiments. For example, some embodiments described can facilitate mapping signal propagation using idle user equipment. Different examples that describe these aspects are included with the description of FIGS. 1-12 below. It should be noted that the subject disclosure may be embodied in many different forms and should not be construed as limited to this example or other examples set forth herein.

As is understood by one having skill in the relevant art(s), given the description herein, lack of beam-steering at idle mode can cause UE attach failures and delays, e.g., when the current network footprint does not encompass idle user equipment, there can be a delay (or failure) when the idle UE attempts to connect to the network, otherwise termed herein, go from idle mode to active mode, to be activated, to become persistently active, and other similar terms. As described herein, one or more embodiments can periodically collect information (e.g., regarding location and signal propagation/interference) then use preemptive actions to improve the network footprint to cover a selected number of idle UEs, e.g., selected based on priority and available resources. As described below, preemptive (e.g., before a connection is requested for the UE) actions can include the creation and direction of new energy beams and the adjustment of existing energy beams, to change the network footprint to cover the selected idle UEs. Different examples that describe these aspects are included with the description of FIGS. 1-12 below.

It should be noted that, although the tracking area update message is frequently used for illustration herein, one having skill in the relevant art(s), given the discussion herein, would appreciate how to use different types of messages can be used for modifications described herein, e.g., to include the administrative information for functions described herein. One should further note that, although directional 5G signals are used for many of the examples herein, many of the different embodiments described and suggested by the disclosure herein, can provide beneficial results when applied to previous generations of wireless communication.

FIG. 1 is an architecture diagram of an example system 100 that can facilitate mapping signal propagation between base station and user equipment in idle mode, in accordance with one or more embodiments. For purposes of brevity, description of like elements and/or processes employed in other embodiments is omitted.

As depicted, system 100 can include controller equipment 150 communicatively coupled via network 190 to base station 195, which is wirelessly connected to UE 155. Based on different conditions discussed herein, UE 155 communicates a message 125 via base station 195 and network 190 to controller equipment 150. In one or more embodiments, controller equipment 150 can include computer executable components 120, processor 160, storage device 162, and memory 165. A discussed further below, computer executable components 120 can include sample receiving component 122, source locating component 124, path loss estimating component 126, and other components described or suggested by different embodiments described herein, that can improve the operation of system 100.

Further to the above, it should be appreciated that these components, as well as aspects of the embodiments of the subject disclosure depicted in this figure and various figures disclosed herein, are for illustration only, and as such, the architecture of such embodiments are not limited to the systems, devices, and/or components depicted therein. For example, in some embodiments, controller equipment 150 can further comprise various computer and/or computing-based elements described herein with reference to mobile handset 1100 of FIG. 11, and operating environment 1200 of FIG. 12. For example, one or more of the different functions of network equipment can be divided among various equipment, including, but not limited to, including equipment at a central node global control located on the core Network, e.g., mobile edge computing (MEC), self-organized networks (SON), or RAN intelligent controller (RIC) network equipment.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1206 and FIG. 12. Such examples of memory 165 can be employed to implement any embodiments of the subject disclosure.

According to multiple embodiments, storage device 162 can include, but is not limited to, RAM, ROM, EEPROM, flash memory or other memory technology, solid state drive (SSD) or other solid-state storage technology, Compact Disk Read Only Memory (CD ROM), digital video disk (DVD), blu-ray disk, or other optical disk storage, magnetic cassettes, magnetic tape, magnetic disk storage or other magnetic storage devices, or any other medium which can be used to store the desired information and which can be accessed by the computer.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more components including, but not limited to, a central processing unit, a multi-core processor, a microprocessor, dual microprocessors, a microcontroller, a system on a chip (SOC), an array processor, a vector processor, and other types of processors. Further examples of processor 160 are described below with reference to processing unit 1204 of FIG. 12. Such examples of processor 160 can be employed to implement any embodiments of the subject disclosure.

In one or more embodiments, computer executable components 120 can be used in connection with implementing one or more of the systems, devices, components, and/or computer-implemented operations shown and described in connection with FIG. 1 or other figures disclosed herein. For example, in one or more embodiments, computer executable components 120 can include instructions that, when executed by processor 160, can facilitate performance of operations defining sample receiving component 122. As discussed with FIGS. 2-6 below, sample receiving component 122 can, in accordance with one or more embodiments, facilitate receiving, a message from a user equipment, with the message including signal information describing detection of a signal of a carrier of base station equipment while the user equipment was in an idle mode at a first location. For example, one or more embodiments can facilitate receiving, a message from a user equipment, with the message including signal information describing detection of a signal of a carrier of base station equipment while the user equipment was in an idle mode at a first location.

Further, in another example, in one or more embodiments, computer executable components 120 can include instructions that, when executed by processor 160, can facilitate performance of operations defining source locating component 124. As discussed with FIGS. 3-4 below, source locating component 124 can, in accordance with one or more embodiments, identify a second location of the base station equipment corresponding to a time when the signal was transmitted, wherein the second location is different from the first location. For example, one or more embodiments can identify a second location of the base station equipment corresponding to a time when the signal was transmitted, wherein the second location is different from the first location.

In yet another example, computer executable components 120 can include instructions that, when executed by processor 160, can facilitate performance of operations defining path loss estimating component 126. As discussed herein, path loss estimating component 126 can, based on the first location, the second location, and the signal information, estimating a path loss of the carrier at the first location. For example, one or more embodiments can, based on the first location, the second location, and the signal information, estimating a path loss of the carrier at the first location.

In a non-limiting example, functions of controller equipment 150 can be implemented at a distributed or central node global control located on the network, e.g., a mobile edge computing (MEC) of a self-organized network (SON), or a RAN Intelligent Controller (RIC).

Figure 2:
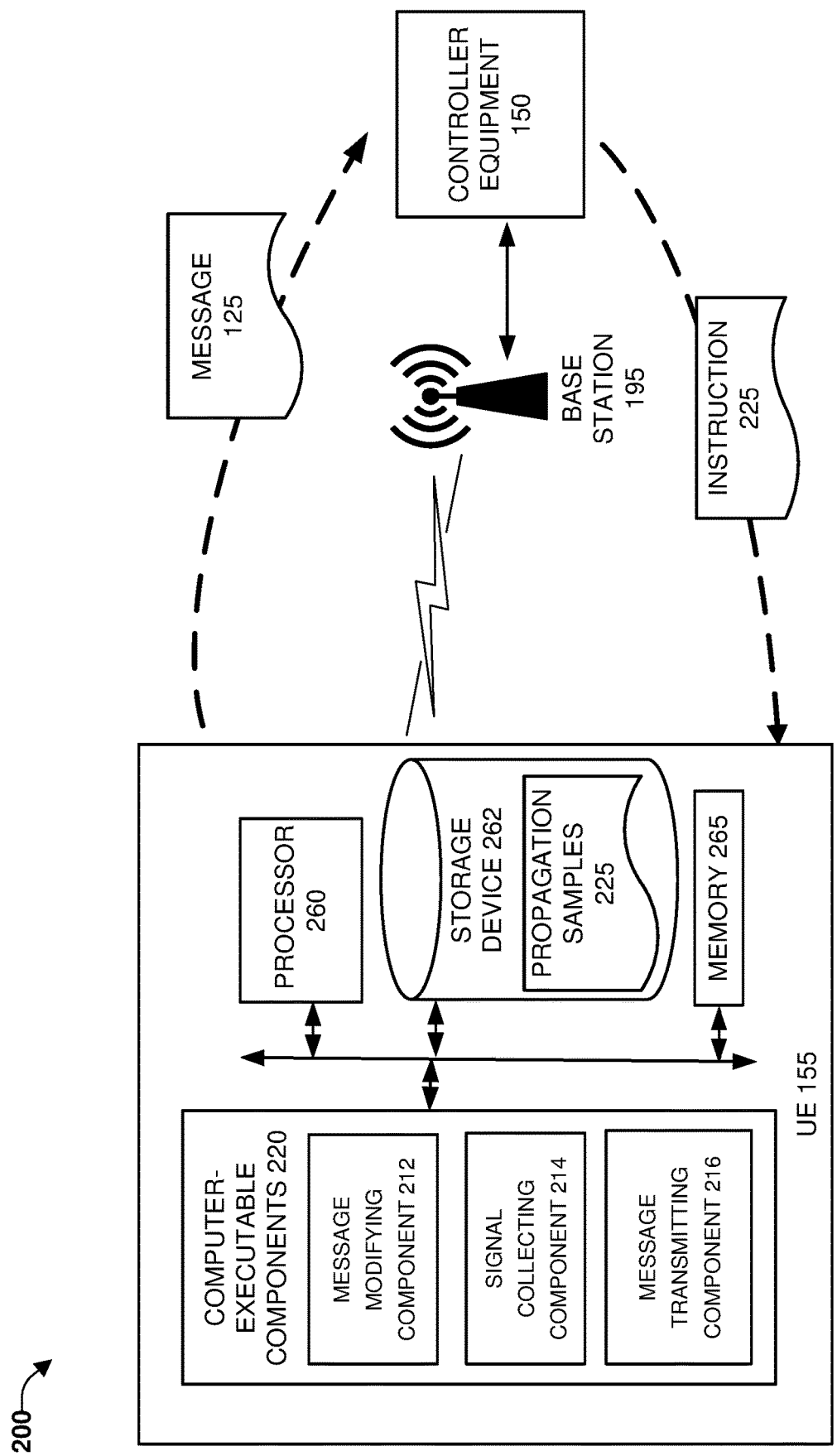
FIG. 2 is a diagram of a non-limiting example system that can facilitate mapping signal propagation using idle user equipment, in accordance with one or more embodiments.

FIG. 2 is a diagram of a non-limiting example system 200 that can facilitate mapping signal propagation using idle user equipment, in accordance with one or more embodiments. For purposes of brevity, description of like elements and/or processes employed in other embodiments is omitted.

As depicted, system 200 can include controller equipment 150 communicatively coupled to UE 155 via base station 195 through network 190. Based on different conditions discussed herein, UE 155 communicates a message 125 via base station 195 and network 190 to controller equipment 150. As discussed further below, to facilitate message 125 being a modified version of an existing type of message, controller equipment 150 can send instruction 225 to UE to implement many of the messaging functions described herein. In one or more embodiments, UE 155 can include computer executable components 220, processor 260, storage device 262 with propagation samples 227, and memory 265.

In system 200, computer executable components 220 can include message modifying component 212, signal collecting component 214, message transmitting component 216, and other components described or suggested by different embodiments described herein that can improve the operation of system 200. For example, in some embodiments, UE 155 can further comprise various computer and/or computing-based elements described herein with reference to mobile handset 1100 of FIG. 11 and operating environment 1200 described with FIG. 12.

For example, in one or more embodiments, computer executable components 220 can be used in connection with implementing one or more of the systems, devices, components, and/or computer-implemented operations shown and described in connection with FIG. 2 or other figures disclosed herein. For example, in one or more embodiments, computer executable components 220 can include instructions that, when executed by processor 260, can facilitate performance of operations defining message modifying component 212. As discussed with FIGS. 3-6 below, in one or more embodiments, message modifying component 212 can receive an instruction message to integrate an additional section into a location update message.

One approach that can be used by one or more embodiments, is to generate a specific message for communicating information, e.g., radio resource messages can be generated by a UE in response to a request from network administration processes for particular information, handover messages can be generated by the UE based on events such as a diminishing signal strength, and mobility messages can be generated by the UE to register a broad change in location from one tracking area to another.

Alternatively, because UEs already communicate different types of information to network administration processes at different times, to reduce the administrative overhead of implementing one or more embodiments, collected signal and location information can be added as a new part of an existing type of message 125. To implement this 'piggyback' approach, UEs can be configured, e.g., by instruction 225 instructing messaging modifying component 212, to modify standard messages to further include additional information useful for one or more embodiments, e.g., UE global positioning system (GPS) location and ambient signal information described herein. For example, in one or more embodiments during the regular generation and sending of an existing network administration message (e.g., a tracking area update message, discussed below), the information generated by one or more embodiments can be added to the existing message, e.g., with the use of existing unused data fields or by repurposing existing data fields, e.g., as shown with the discussion of FIG. 7 below.

An example general type of message that can be used by one or more embodiments described herein is an idle message, e.g., like the tracking area update message, messages that can be generated by the UE during a time when the UE is not actively wirelessly communicating with the network in a call or exchanging mobile data. In one or more embodiments, idle messages can be generated based on a UE actively collecting information even though the UE is in an idle state. In one or more embodiments, for some idle messaging the collected information can be collected stored before being used to generate an idle message.

Generally speaking, tracking area updates are messages sent by a UE to the network that can be used to inform the network when the UE, in an idle state of communication moves from one tracking area to another, e.g., often termed mobility messages because they can facilitate an idle UE being located by a paging message, even if it changes tracking areas while idle. In some implementations, a tracking area update message can also be generated and sent by a UE at a particular time interval, with this interval potentially being changed as described below by one or more embodiments.

It is appreciated by one having skill in the relevant art(s) that when an idle UE 155 detects that is has moved from one tracking area to another, the UE can subsequently transmit a tracking area update message by briefly transitioning out of the idle state of communications to receive the signals that can indicate the tracking area change and to communicate the update message to network administration processes. In addition, the idle state of communications can be used by the UE to reduce power consumption from communications processes but does not mean that the UE is not performing processing operations.

For these tracking area update examples, it should be noted that, in many circumstances, a tracking area can refer to a collection of radio cells that can vary in size based on terrain and reception characteristics. Because of this, a tracking area can vary in size up to being hundreds of square kilometers, e.g., a tracking area update does not generally provide a granular indication of the location of a UE, as can be provided by global navigation satellite systems (GNSS). Thus, while tracking area update messages can be described as facilitating a tracking of location by controller equipment 150 within a broad area, this tracking is generally not sufficient to allocate antenna resources for the types of functions (e.g., accelerated connections to mode transitioning UEs) described with some embodiments herein.

In addition to modifying an existing messaging procedure by adding (potentially unrelated) information to message 125, one or more embodiments can alter procedures by which the existing messages are sent. For example, as noted above, messages can be sent based on different events, e.g., based on a request, based on a change in signal strength, based on a change to a different tracking area, or at particular intervals. For one or more embodiments, to facilitate achieving the goals of the newly generated and sent information, the triggering events for sending the tracking area update message can be changed.

With respect to the message triggering events, it should be noted that one or more embodiments can beneficially alter the conditions to facilitate use of the appended information, while preserving the original function of the altered message 125. For example, because the tracking area update message is triggered to be sent at a particular interval, in one or more embodiments, this interval can be reduced, e.g., to establish an increased granularity for the existing messaging because, for example, the signal and GPS location data described herein can be more useful if received more frequently by controller equipment 150. In one or more embodiments, the extra processing and battery overhead for the UE from the increased frequency of sending a tracking area update can be compared to the utility of the extra information provided for network administration.

In another example, in one or more embodiments, computer executable components 220 can include instructions that, when executed by processor 260, can facilitate performance of operations defining, signal collecting component 214. Signal collecting component 214 can, in accordance with one or more embodiments, collect, during an idle state, signal propagation information applicable to a location. Example types of signal and location data that can be collected, along with the uses for which one or more embodiments can apply the collected data, as described with FIGS. 3-6 below. One approach to collecting signal information by UE 155 is by using idle channel measurements from the phone from system information block (SIB) messages as well as master information block (MIB) messages In another example, in one or more embodiments, computer executable components 220 can include instructions that, when executed by processor 260, can facilitate performance of operations defining, message transmitting component 216. In one or more embodiments, message transmitting component 216 can transmit the updated location update message to second network equipment, wherein the section comprises the signal propagation information and the location, and wherein the signal propagation information is usable by the second network equipment to estimate a path loss for the location.

Figure 3:
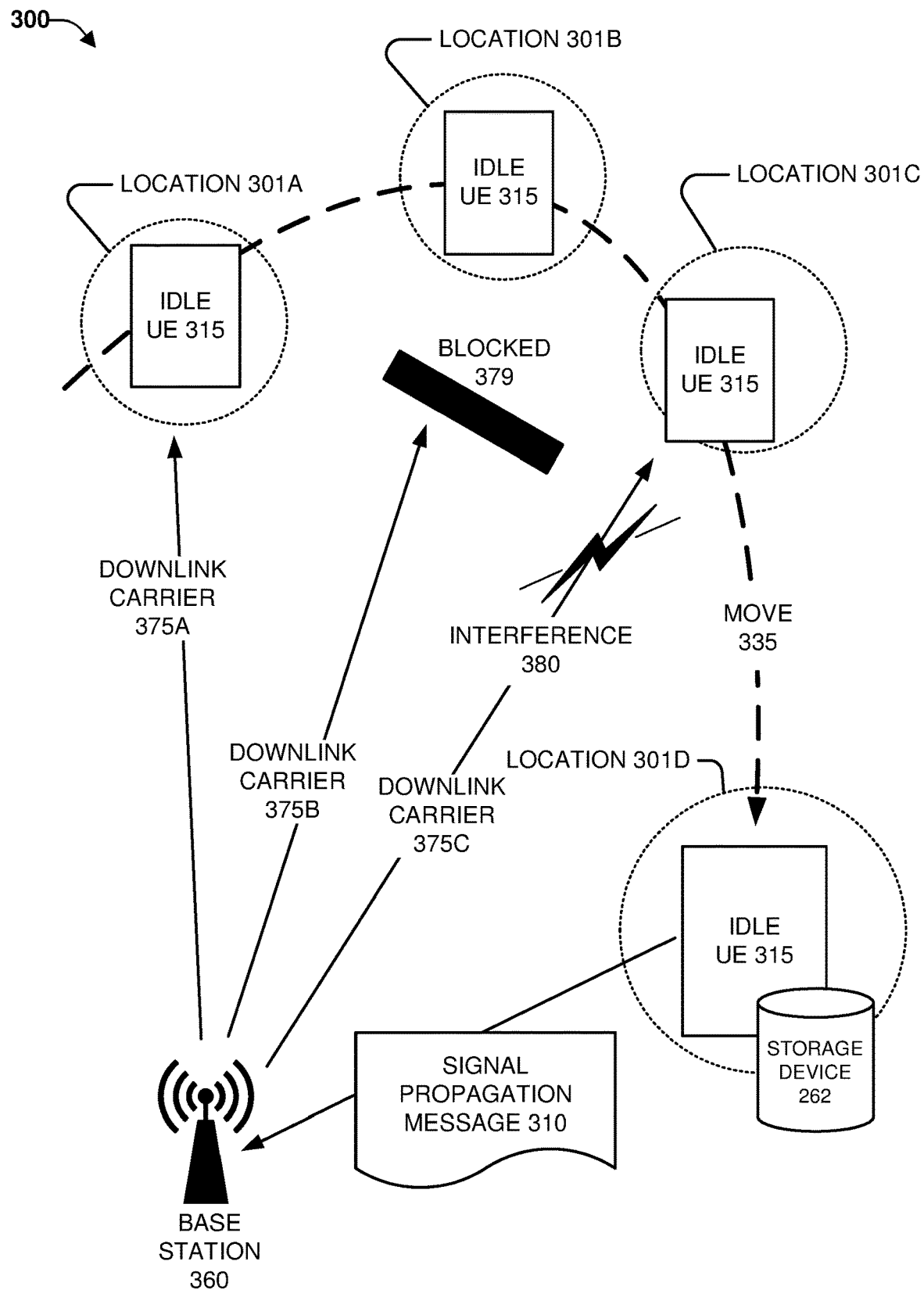
FIG. 3 is a diagram of a non-limiting example system that can facilitate mapping signal propagation using idle user equipment, in accordance with one or more embodiments.

FIG. 3 is a diagram of a non-limiting example system 300 that can facilitate mapping idle mode signal propagation measurements from a single user equipment as they transition in the network, in accordance with one or more embodiments. For purposes of brevity, description of like elements and/or processes employed in other embodiments is omitted. System 300 includes locations 301A-C where idle UE 315 moves, where downlink carriers 375A-C are respectively directed to the three locations at the same time idle UE 315 is at the locations. Location 301D depicts a position where the idle UE 315 is triggered to transmit signal propagation message 310 to base station 360, with this message including the previously gathered samples stored in storage device 262.

Carriers 375A-C are respectively communicated to locations 301A-C by base station 360. In one or more embodiments, base station 360 can be a fifth or later generation network base station. One having skill in the relevant art(s), given the discussion herein, understands that 5G networks that may use waveforms that split the bandwidth into several sub-bands, with different types of services being accommodated in different sub-bands with complementary waveform and numerology, e.g., leading to improved spectrum utilization for 5G networks. In some implementations, base station 360 can use the mmWave spectrum, with the millimeter waves have shorter wavelengths relative to other communications waves, and thus potentially experiencing higher degrees of path loss, penetration loss, and fading than larger wavelength signals.

In one or more embodiments, the shorter wavelength at mmWave frequencies can also enable more antennas to be located in the same physical dimension, which can enable large-scale spatial multiplexing and highly directional beamforming, e.g., with phased antenna arrays it is possible to create and control the shape and direction of the signal beam from multiple antennas based on the antenna spacing and the phase of signal from each antenna element in the array. In some circumstances, the more radiating elements that make up the antenna, the narrower the beam.

In an example depicted in FIG. 3, to facilitate some of the signal propagation analysis functions described herein, base station 360 can periodically send out carrier signals (e.g., downlink carriers 375A-C) directed to different locations, e.g., locations 301A-C. One or more embodiments can gather information about the path loss of downlink carriers 375A-C in directions towards locations 301A-C and at locations 301A-C, e.g., via periodic samples collected by idle user equipment (e.g., idle UE 315). As idle UE 315 is moved by a user, because base station is periodically sending out signals in different directions, occasionally idle UE 315 will intersect with a signal from base station 360. As would be appreciated by one having skill in the relevant art(s), given the description herein, these carrier signals can have different characteristics including but not limited to frequency band, channel within frequency band, and signal strength, with different characteristics being stored by base station 360 for later use in path loss analysis.

In the example intersection shown at location 301A, downlink carrier has characteristics similar to those described above, and is directed toward location 301A. In one or more embodiments, idle UE 315 has been selected to periodically (e.g., at an interval or randomly) sample for radio waves within selected spectra. This periodic sampling has been selected to provide samples while still conserving the battery power of idle UE 315, as can be a purpose of some idle mode implementations.

The sampling time and the time of downlink carrier 375A coincidently intersect, and idle UE detects downlink carrier 375A, along with interference associated with carrier 375A (e.g., if the interference is within the sampled spectra specification). Upon detecting a sample, idle UE 315 uses a location determining technology to identify the receipt location of the sample. Once the combination of elements including, but not limited to, time, location, and signal characteristics, are collected, the sample can be stored in storage device 262 for later upload, e.g., to conserve battery in idle mode by not frequently transmitting information.

In a variation of this approach, one or more embodiments receive propagation data from downlink carrier 375A that is beyond the characteristics of the signal discussed above. In one or more embodiments, idle UE 315 can receive and demodulate the signal to identify useful propagation information including, but not limited to, an identifier that identifies base station 360, as well as an identifier that identifies the particular transmission of downlink carrier 375A. This information can also be stored in storage device 262 with the other sample data discussed above.

Continuing this example, at location 301B, idle UE 315 is in a position to intersect with downlink carrier 375B. In one or more embodiments, at the time of the periodic sampling, if no signals are detected, this can be stored in storage device 262 as a sample. Because in this example, downlink carrier 375B is blocked 379, idle UE 315 does not detect the carrier. At location 301C, the periodic sampling of idle UE 315 is again triggered, and both downlink carrier 375C and interference 380 are detected and added to a time stamped location sample.

At location 301D, a triggering event occurs that causes idle UE 315 to generate and communicate signal propagation message 310 to base station 360. In an example, from base station 360 the sample data can be received by controller equipment 150, e.g., by sample receiving component 122. For the sample collected at location 301A, source locating component 124 can identify the source of the signal as base station 360, e.g., either by correlating the time and location the sample was received with the record of the transmission of downlink carrier 375A, or by identifying the cell ID of base station 360, if this information was determined from the signal. Once base station 360 and the particular sample are identified, the data described above can be accessed and used for analysis, e.g., the location of base station 360 and characteristics of downlink carrier 375A such as transmission power, antenna aiming, etc.

One having skill in the relevant art(s), given the description herein appreciates how the data sampling approach above can be used to determine different path loss measurements for base station 360, e.g., especially when combined with many devices over time.

For the sample collected at location 301B, the lack of any signal at that location can be cross referenced with signals that should have been detectable at that location, and information regarding downlink carrier 375B can be determined, e.g., the existence of block 379. Once again, the combination of many samples from different users in the network can provide additional correlating data for different conclusions. For the sample collected at location 301C, interference 380 can be noted, and available information can be used to determine the source of the interference, e.g., transmission from another base station of the network. This base station can be identified in a similar way as base station 360 was identified (e.g., signals transmitted in a direction at a time), or a cell ID of the different base station could be available, as discussed above.

With reference to samples from different base stations being correlated with each other, it should be noted that, for one or more of the signal propagation messages described herein, the data regarding a base station does not need to be delivered to the base station in order to be interpreted.

Figure 4:
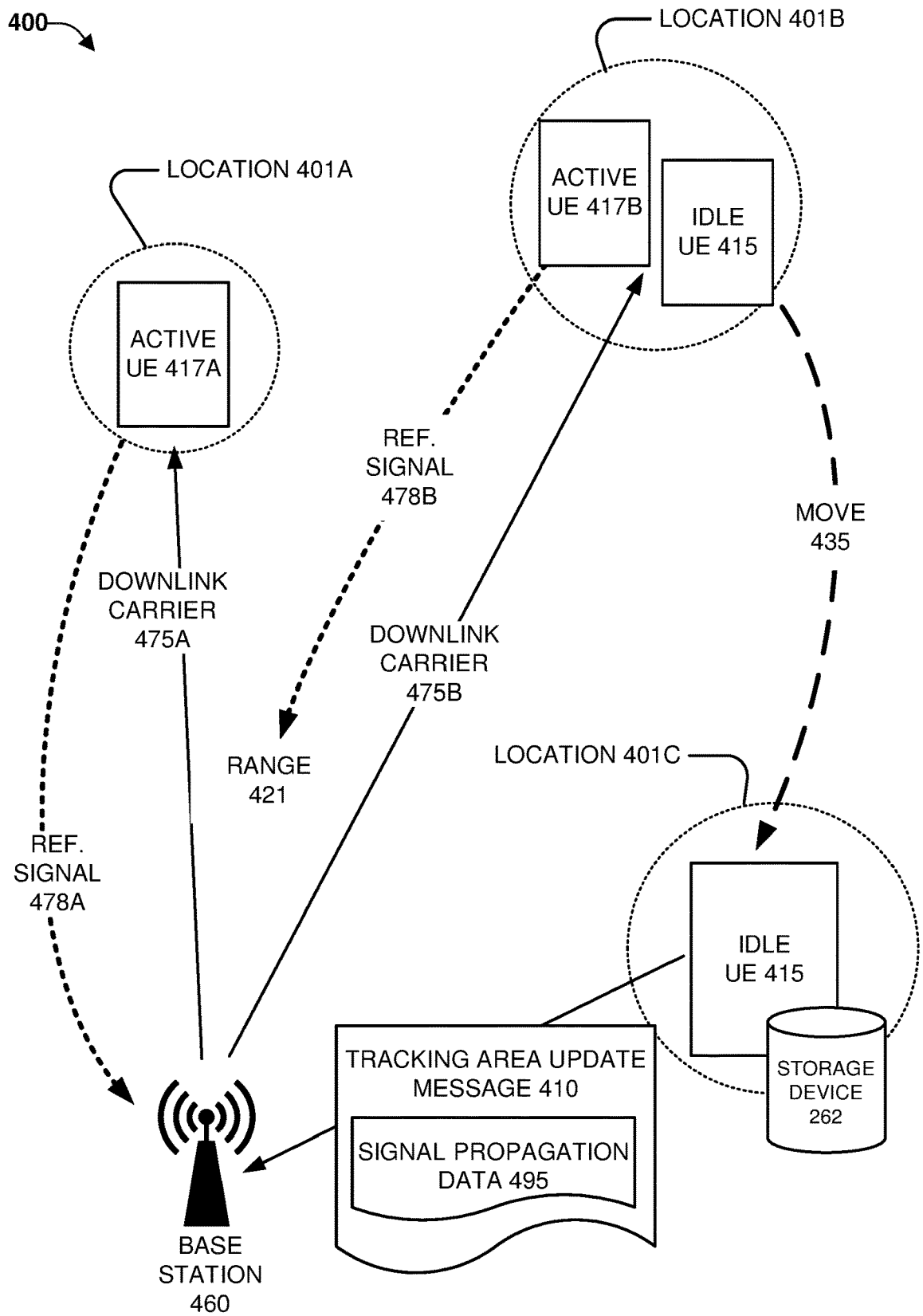
FIG. 4 depicts is a diagram of a non-limiting example system that can facilitate mapping signal propagation by combining samples from active and idle user equipment, in accordance with one or more embodiments.

FIG. 4 depicts is a diagram of a non-limiting example system 400 that can facilitate mapping signal propagation by combining samples from active mode and idle mode user equipment, in accordance with one or more embodiments. For purposes of brevity, description of like elements and/or processes employed in other embodiments is omitted. System 400 includes active UE 417A at location 401A, active UE 417B and idle UE 415 at location 401B, and idle UE moving 435 to location 401C to transmit tracking area update message 410 with an added portion for signal propagation data from storage device 262.

At location 401A an example of an active UE 417A providing a reference signal 478A to base station 460 in response to downlink carrier 475A. For active UE 417A base station 460 can receive updated information and track the UE position with reference signals frequently provided to base station 360 to enable rapid performance of functions including, but not limited to cell selection and reselection, seamless handover from one cell to another, mobility measurements, and estimating propagation values for power control calculations.

One or more embodiments can supplement or substitute for signal propagation data from active mode UEs based on data systematically collected by idle UEs and combined together over time. At any given time in wireless networks, there can be many more UEs in idle mode than active mode UEs. Even with one or more embodiment selecting a subset of idle UEs for periodic data collection, a large number of samples can be collected and used to determine initial path losses for signals, as well as updating the accuracy of signals predicted to any given location over time.

In the example depicted in location 401B, one or more embodiments can determine information regarding both downlink and uplink signals. One having skill in the relevant art(s), given the disclosure herein, understands that many approaches to determining the range of base stations is to measure downlink signals, while not always determining that uplink signals from the user equipment can be received by the transmitting source of the downlink signals.

As depicted in FIG. 4, both active UE 417B and idle UE 415 receive downlink carrier 475B. In this example, active UE 417B attempts to send an acknowledgement of receipt with reference signal 478B, but this signal does not have the range 421 to reach base station 460. Because many UEs will not store sampled signals over time, in many circumstances, this information regarding the uplink associated with downlink carrier 475B will be abandoned.

In one or more embodiments, to address this issue, as described herein, idle UE 415 receives and samples downlink carrier 475B, then stores the sample information in storage device 262 until tracking area update message 410 is triggered, and is sent along with signal propagation data 495. Once this information is analyzed by path loss estimating component 126, in one or more embodiments, the collected sample from idle UE 415 can be cross referenced with the location of active UE 417B at the time the sample was collected. The lack of response from active UE 417B thus becomes additional data to assessing the downlink and return uplink path loss of downlink carrier 475B.

An additional aspect of one or more embodiments can be illustrated by FIG. 4 concerns the active adjustment of signals communicated to active UE 417A. Approaches to antenna aiming for some base stations can involve the use of dynamically moving antenna elements in different circumstances, as well as approaches where a beam pattern can be dynamically directed by changing the signal phase in real time without changing the antenna elements or other hardware, e.g., beamsteering. Because idle UE 415 is in idle mode, and thus not actively sharing a location or connection specifics, these active measures generally cannot be applied to sample signals received by these devices in idle mode. One or more embodiments can assess the impact of the differences in signal optimization between active and idle mode UEs, when combining signal propagation data from these sources, as described herein.

Figure 5:
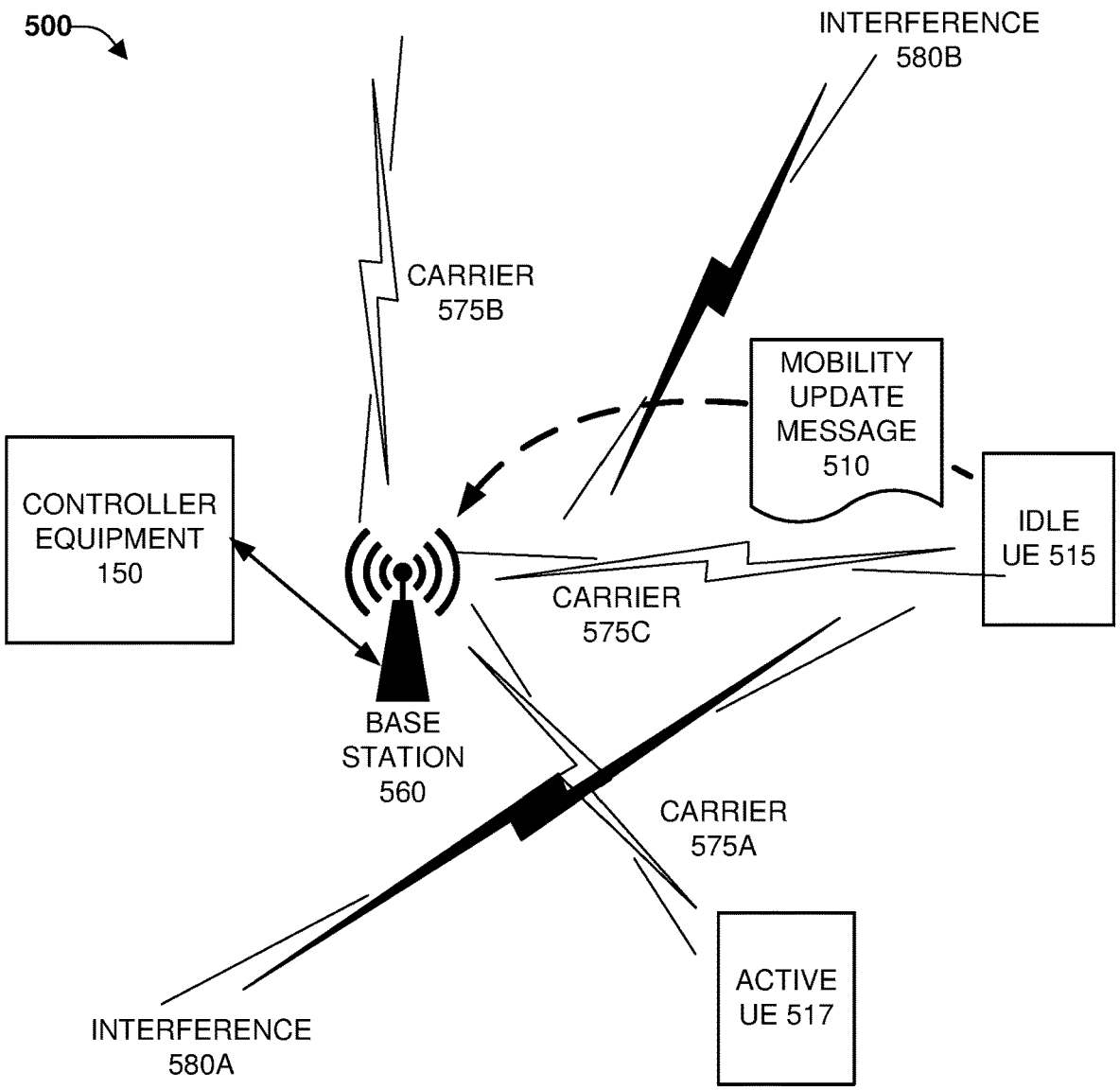
FIG. 5 is a diagram of a non-limiting example system that can facilitate mapping signal propagation using idle user equipment, in accordance with one or more embodiments.

FIG. 5 is a diagram of a non-limiting example system 500 that can facilitate mapping signal propagation using idle mode user equipment, in accordance with one or more embodiments. For purposes of brevity, description of like elements and/or processes employed in other embodiments is omitted. As depicted, system 500 shows controller equipment 150 connected to base station 560, serving idle UE 515 and active UE 517. To facilitate contrasting different approaches to interacting with idle UE 515 described herein to approaches used to interact with active UE 517, carriers 575A-C and interference 580A-B are depicted.

As noted above, approaches to antenna aiming can be used in this example, for active UE 517. In contrast, in one approach to interacting with idle UE 515, because the data bearer for this UE is generally released, base station 560 does not have information regarding the stage or location of idle UE 515, thus, as noted above adjustments may not be made to facilitate connections. In some circumstances, when idle UE 515 is requested to transition to an active mode, this approach can cause UE attach failure and/or delay. This negative outcome can occur because of base station 560 already having allocated available antenna resources to carriers 575A-B, with fewer resources being available for a requested carrier 575C. Even if sufficient resources are available to serve transitioning idle UE 515, there can be a delay in connection because base station 560 does not have the carrier 575C energy beam ready and directed toward the user equipment as depicted.

In one or more embodiments, by providing the periodic idle mode messaging regarding the signaling environment and location of idle UE 515 (e.g., mobility message update 510 with appended information), the above-noted delays can be reduced, e.g., by base station 560 reserving resources to handle idle UE 515 as a device with the potential to require a rapid connection. In one or more embodiments, just as carriers 575A-B frequency beams can be steered in different directions to serve active UE 517 and other devices, the direction of carrier 575C can be updated dynamically by base station 560 as idle UE 515 moves, effectively tracking idle UE 515, albeit at a less frequent interval than active UE 517 in some circumstances based on a conservation of battery power for the idled device.

In another problem depicted in FIG. 5, interference 580A can interfere with active UE 517 using carrier 575A, e.g., multiple neighboring beams can overlap and therefore create inter-cell interference. Based on reference signals provided to base station 560 by active UE 517 however, this interference can be rapidly identified and avoided. In contrast, without different approaches described herein, when idle UE 515 attempts to transition from idle to a connected mode, interference 580B can prevent idle UE 515 from establishing the connection. Unlike carrier 575A, where interference 580A can be rapidly detected and actively avoided by base station 560, both interference 580B and the resulting problems experienced by transitioning idle UE 515 may be unknown to base station 560.

In a different approach utilized by one or more embodiments described herein, because idle UE 515 can detect and characterize interference 580B, this information can be periodically provided by mobility update message 510 to base station 560. Based on this information, when base station preemptively generates carrier 575C directed to the potentially transitioning idle UE 515, interference 580B can be considered when selecting from available bands. Alternatively, because controller equipment 150 can have information describing multiple base stations in the area, interference 580B can cause a different base station to provide carrier 575C to be ready to accommodate the transition of idle UE 515.

The examples of FIG. 5 are directed to simple examples where one idle UE 515 is discussed. It should be noted that, while conventional oversubscription of network resources can rely upon a small percentage of all UEs in an area being active at a particular time, this approach to allocating scarce resources generally does not apply as well to the preemptive provision of resources for the potential transition of idle UEs to active UEs, e.g., in some circumstances, a much larger percentage of idle UEs could potentially transition in a given moment than the percentage of active UEs to idle UEs. FIG. 4 describes different approaches that can be used by one or more embodiments to allocate resources to idle UEs within an area.

Figure 6:
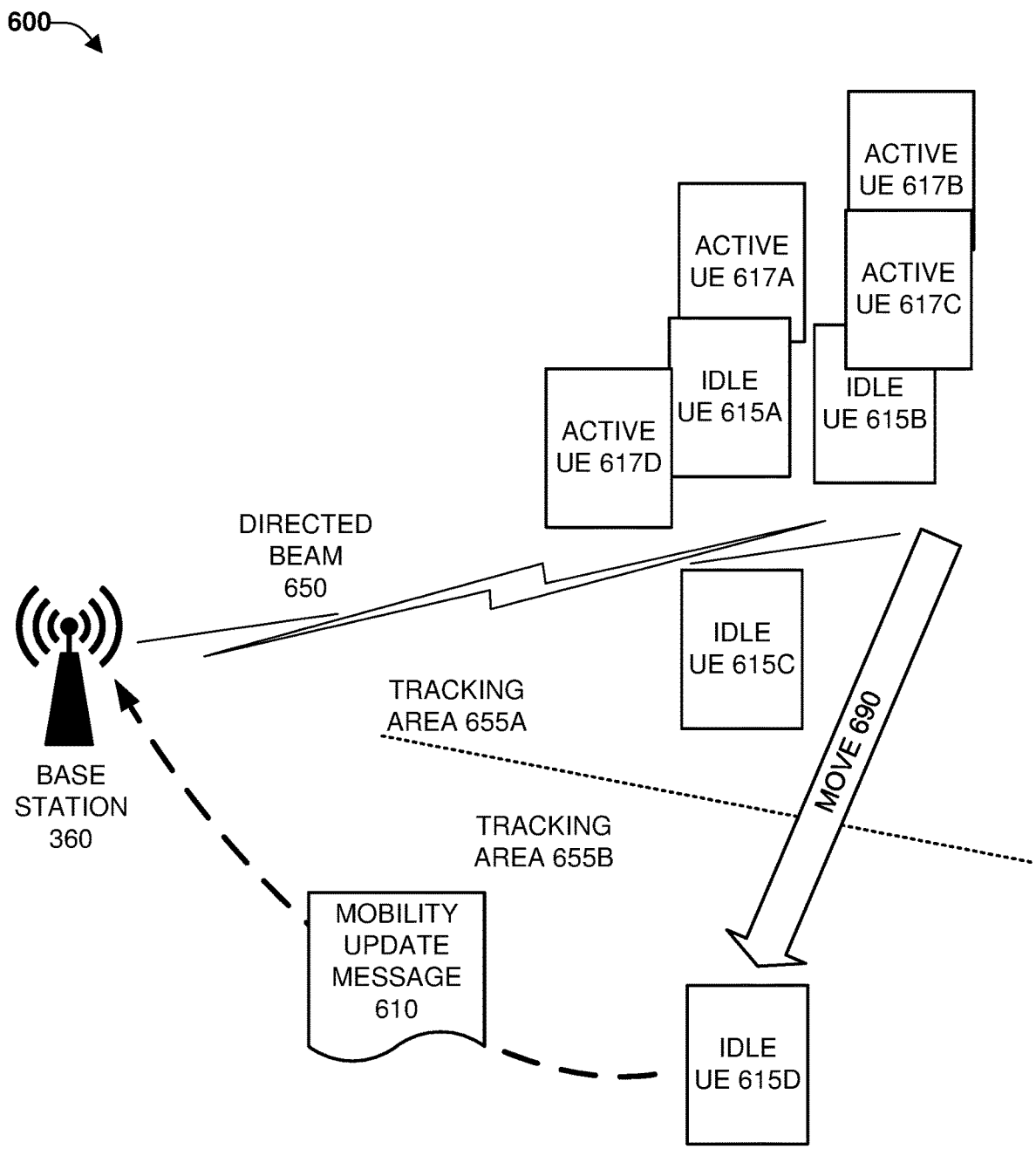
FIG. 6 depicts an example of a system that can facilitate mapping signal propagation using idle user equipment, in accordance with one or more embodiments.

FIG. 6 depicts an example of a system 600 that can facilitate mapping signal propagation using idle user equipment, in accordance with one or more embodiments. For purposes of brevity, description of like elements and/or processes employed in other embodiments is omitted. In one or more embodiments, as depicted, system 600 includes base station 360, idle UEs 615A-D and active UEs 617A-D. In an example, base station 360 can provide directed beam 650 to serve the UEs.

In an example, idle UE 615D in tracking area 655A provided a mobility update message (not shown) to controller equipment 150 via base station 360, with action being triggered by idle events described and suggested herein, e.g., the expiration of a time interval. Based on different factors of antenna resource prioritization (e.g., UE priority, UE idle status, other UEs), following an approach described above, using a GPS location from the mobility message, base station 360 can cause directed beam 650 to be directed to provide a rapid connection, should UE 615D transition to an active mode.

Continuing this example, idle UE 615D moves 690 to the new location in tracking area 655B (for the purposes of this example, base station 360 serves both tracking areas 655A-B). In terms of how controller equipment 150 handles the receipt of mobility update message 610 in one or more embodiments, different approaches to antenna resource allocation can be considered. As noted above, in some circumstances, a large number of idle UEs could potentially transition in a given moment, and thus idle UEs are considered for the different benefits of directed beam 650 described herein. In one or more embodiments, a number of idle UEs can be dynamically selected and configured based on cell load (e.g., if cell is heavily loaded then embodiments may configure to a lower percentage of UEs to be selected). In additional embodiments, to distribute benefits evenly over time, selection of idle UEs for allocated antenna resources can be random.

Returning to the example, as depicted, idle UE 615D has moved from a congested location to a location without other UEs. Because of this, one or more embodiments can leave directed beam 650 in its depicted location, e.g., potentially facilitating rapid connections for multiple idle UEs 615A-C, all three of which have provided idle location updates to controller equipment 150 and thus can be targeted.

FIG. 7 is a diagram of a non-limiting example addendum to administrative messages that can provide additional antenna resource allocating information, in accordance with one or more embodiments. For purposes of brevity, description of like elements and/or processes employed in other embodiments is omitted.

As depicted, an example mobility update addendum 710 can include, but is not limited to the following characteristics of signals: frequency of signal analyzed 720A, power level of signal analyzed 720B, UE calculated pathloss 720C, location of UE at sample collection 720D, current location 720E, effective isotropic radiated Power (EIRP) 720F, evolved universal terrestrial radio access network (E-UTRAN) cell global identifier (ECGI) of cell 720G, physical cell identifier (PCI) 720H, current frequency of carrier measured 720I, reference signal received power (RSRP) of serving cell, beam ID 720J, idle channel measurements from the phone 720K, power allocation setting of UE 720L, and model of UE 720M.

Figure 8:
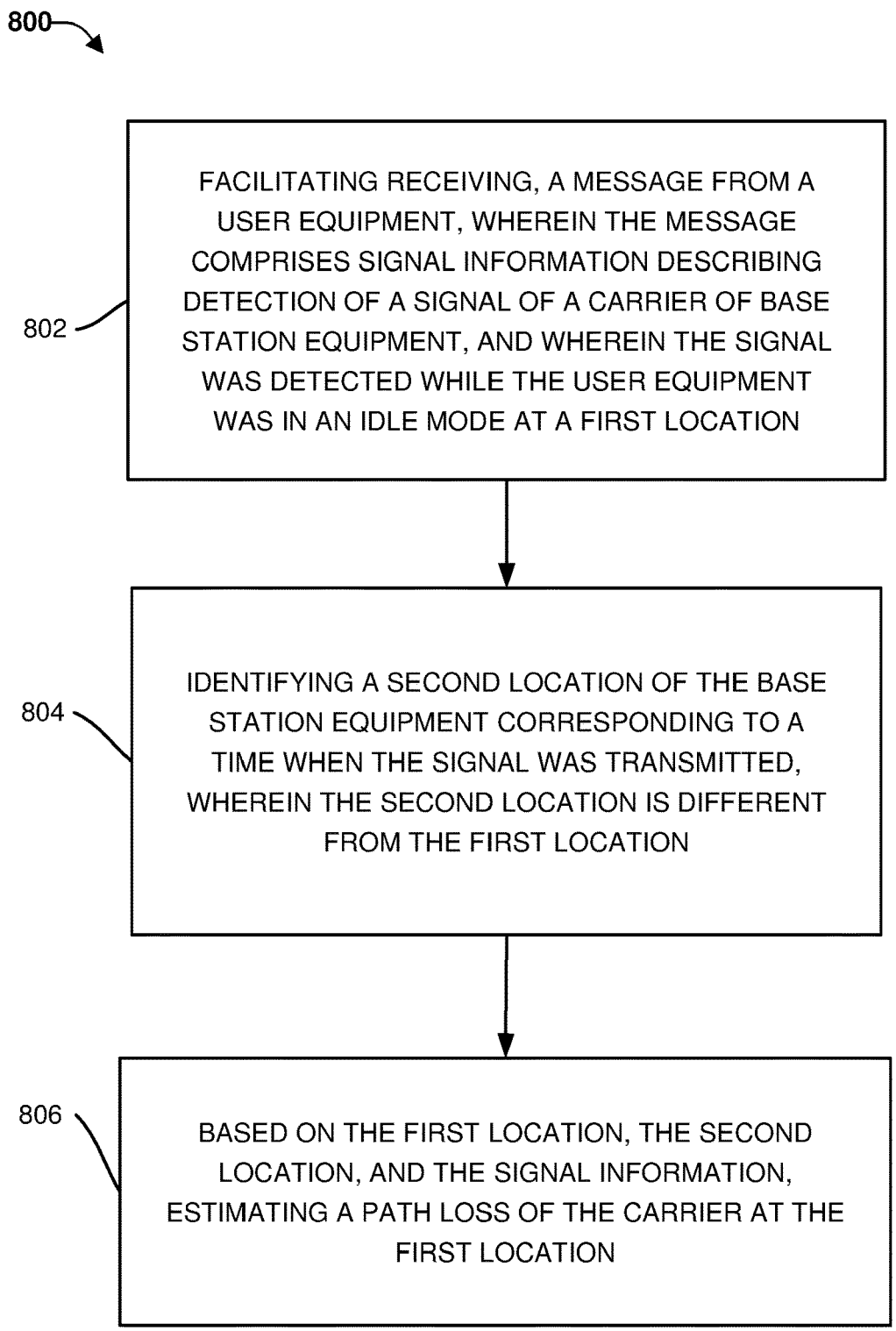
FIG. 8 illustrates an example method that can facilitate mapping signal propagation using idle user equipment, in accordance with one or more embodiments.

FIG. 8 illustrates an example method 800 that can facilitate mapping signal propagation using idle user equipment, in accordance with one or more embodiments. For purposes of brevity, description of like elements and/or processes employed in other embodiments is omitted. At 802, method 800 can include facilitating receiving, a message from a user equipment, with the message including signal information describing detection of a signal of a carrier of base station equipment while the user equipment was in an idle mode at a first location. For example, in one or more embodiments a method can include facilitating receiving, a message from a user equipment, with the message including signal information describing detection of a signal of a carrier of base station equipment while the user equipment was in an idle mode at a first location.

At 804, method 800 can include identifying a second location of the base station equipment corresponding to a time when the signal was transmitted, wherein the second location is different from the first location. For example, in one or more embodiments a method can include identifying a second location of the base station equipment corresponding to a time when the signal was transmitted, wherein the second location is different from the first location. At 806, method 800 can include based on the first location, the second location, and the signal information, estimating a path loss of the carrier at the first location. For example, in one or more embodiments a method can include based on the first location, the second location, and the signal information, estimating a path loss of the carrier at the first location.

Figure 9:
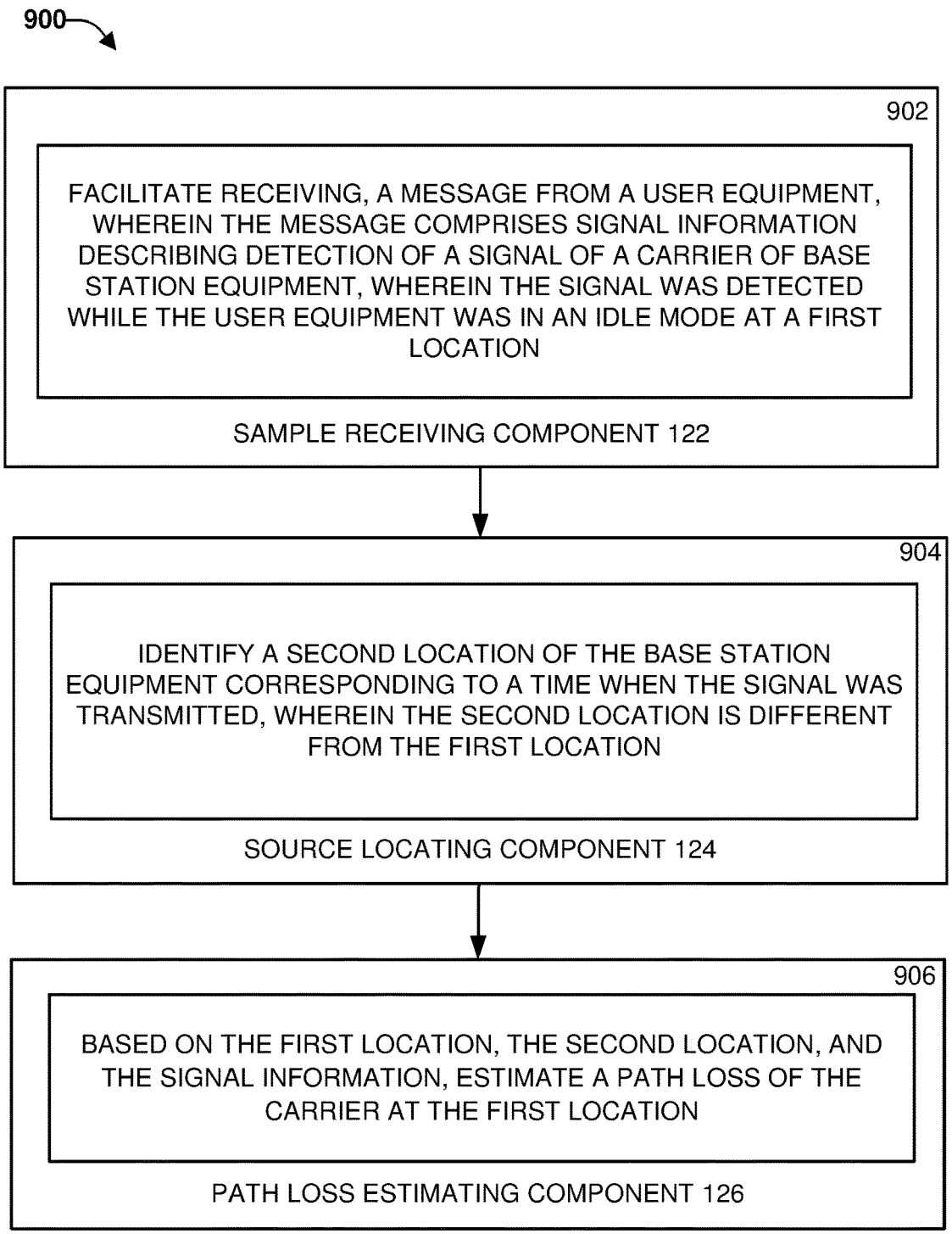
FIG. 9 depicts a system that can facilitate mapping signal propagation using idle user equipment, in accordance with one or more embodiments.

FIG. 9 depicts a system 900 that can facilitate mapping signal propagation using idle user equipment, in accordance with one or more embodiments. For purposes of brevity, description of like elements and/or processes employed in other embodiments is omitted. As depicted, system 900 can include sample receiving component 122, source locating component 124, path loss estimating component 126, and other components described or suggested by different embodiments described herein, that can improve the operation of system 900.

In an example, component 902 can include the functions of sample receiving component 122, supported by the other layers of system 900. For example, component 902 can facilitate receiving, a message from a user equipment, with the message including signal information describing detection of a signal of a carrier of base station equipment while the user equipment was in an idle mode at a first location. For example, one or more embodiments can facilitate receiving, a message from a user equipment, with the message including signal information describing detection of a signal of a carrier of base station equipment while the user equipment was in an idle mode at a first location. In this and other examples, component 904 can include the functions of source locating component 124, supported by the other layers of system 900. Continuing this example, in one or more embodiments, component 904 can identify a second location of the base station equipment corresponding to a time when the signal was transmitted, wherein the second location is different from the first location. For example, one or more embodiments can identify a second location of the base station equipment corresponding to a time when the signal was transmitted, wherein the second location is different from the first location.

In a further aspect of the example, component 906 can include the functions of path loss estimating component 126, supported by the other layers of system 900. For example, component 906 can, based on the first location, the second location, and the signal information, estimate a path loss of the carrier at the first location. For example, in one or more embodiments, path loss estimating component 126 of controller equipment 150 can, based on the first location, the second location, and the signal information, estimate a path loss of the carrier at the first location.

Figure 10:
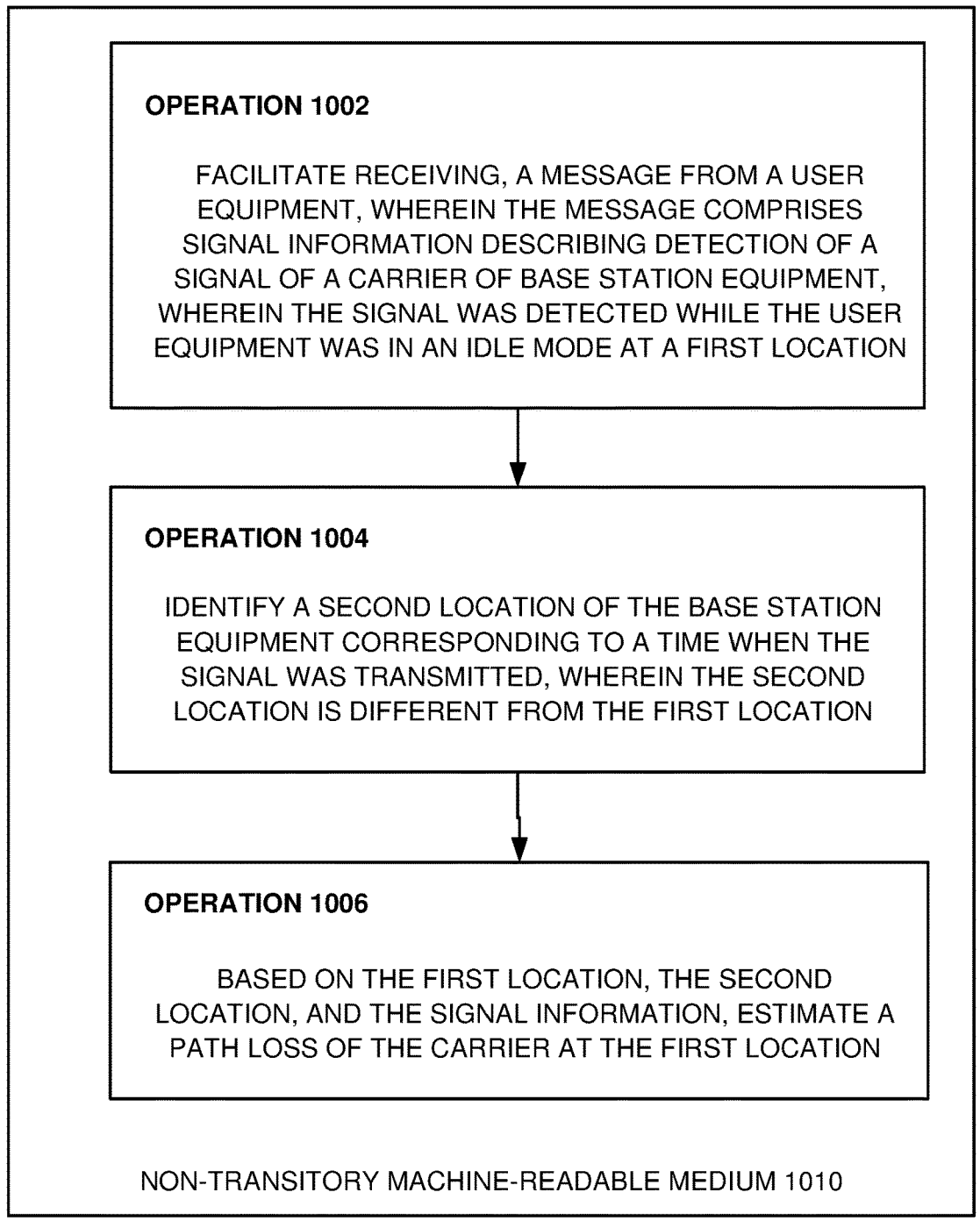
FIG. 10 depicts an example non-transitory machine-readable medium that can include executable instructions that, when executed by a processor of a system, facilitate mapping signal propagation using idle user equipment, in accordance with one or more embodiments described above.

FIG. 10 depicts an example 1000 non-transitory machine-readable medium 1010 that can include executable instructions that, when executed by a processor of a system, facilitate mapping signal propagation using idle user equipment, in accordance with one or more embodiments described above. For purposes of brevity, description of like elements and/or processes employed in other embodiments is omitted. As depicted, non-transitory machine-readable medium 1010 includes executable instructions that can facilitate performance of operations 1002-1006.

In one or more embodiments, the operations can include operation 1002 that can facilitate receiving, a message from a user equipment, with the message including signal information describing detection of a signal of a carrier of base station equipment while the user equipment was in an idle mode at a first location. For example, one or more embodiments can facilitate receiving, a message 125 from a user equipment 155, with the message including signal information describing detection of a signal of a carrier of base station 195 equipment while the user equipment was in an idle mode at a first location 301A.

Further, operations can include operation 1004, that can identify a second location of the base station equipment corresponding to a time when the signal was transmitted, wherein the second location is different from the first location. For example, one or more embodiments can identify a second location of the base station 195 equipment corresponding to a time when the signal was transmitted, wherein the second location is different from the first location.

In one or more embodiments, the operations can further include operation 1006 that can, based on the first location, the second location, and the signal information, estimate a path loss of the carrier at the first location. For example, one or more embodiments can, based on the first location, the second location, and the signal information, estimate a path loss of the carrier at the first location.

Figure 11:
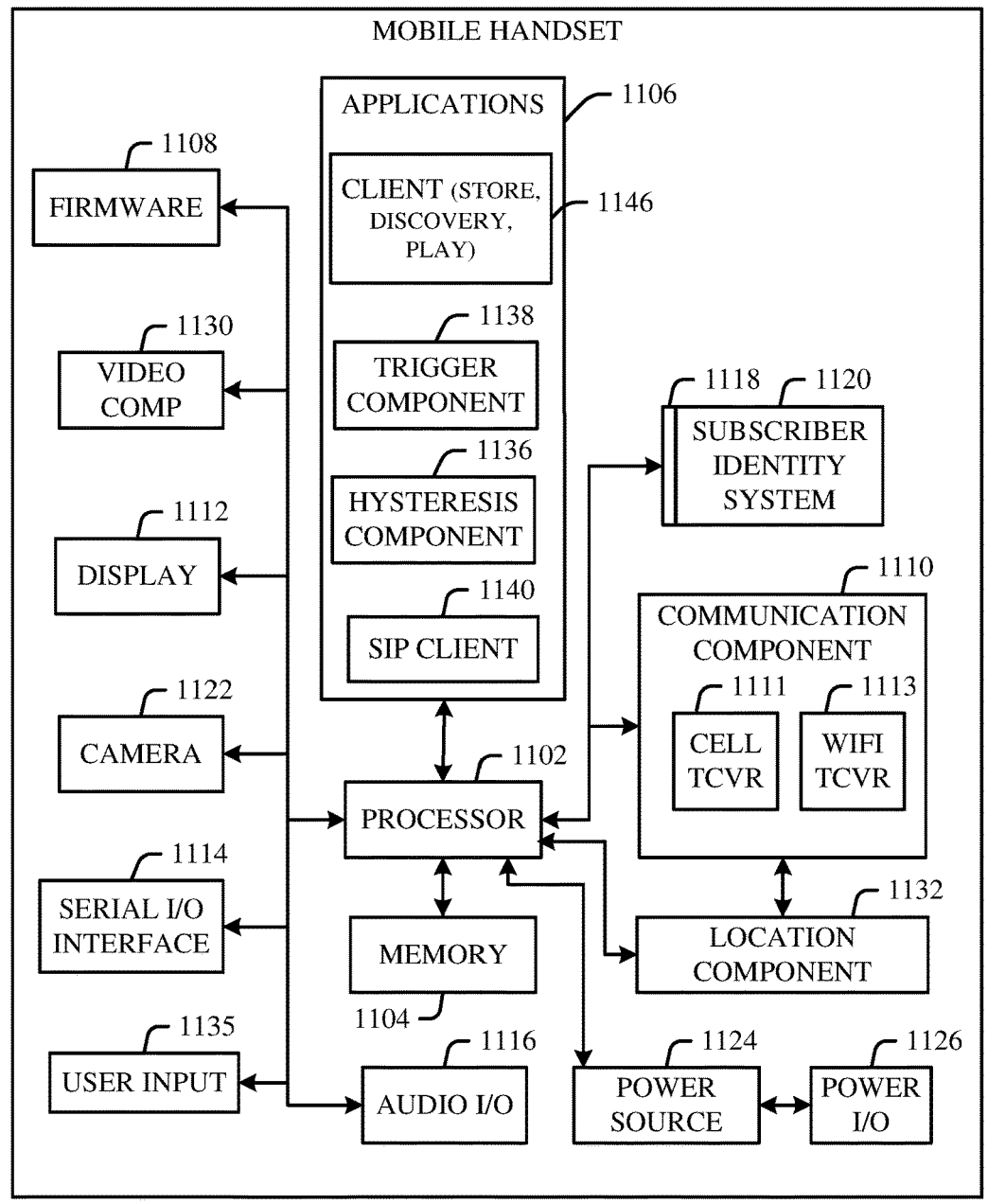
FIG. 11 illustrates an example block diagram of an example mobile handset operable to engage in a system architecture that facilitates wireless communications according to one or more embodiments described herein.

FIG. 11 illustrates an example block diagram of an example mobile handset 1100 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and can include any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1294) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card SIM or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communications component 1110 to accommodate IP traffic from an IP network such as, for example, the Internet, a corporate intranet, a home network, a person area network, etc., through an ISP or broadband cable provider. Thus, VoIP traffic can be utilized by the handset 1100 and IP-based multimedia content can be received in either an encoded or a decoded format.

A video processing component 1122 (e.g., a camera) can be provided for decoding encoded multimedia content. The video processing component 1122 can aid in facilitating the generation, editing, and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1136 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 1110, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Network 190 can employ various cellular systems, technologies, and modulation schemes to facilitate wireless radio communications between devices. While example embodiments include use of 5G new radio (NR) systems, one or more embodiments discussed herein can be applicable to any radio access technology (RAT) or multi-RAT system, including where user equipment operate using multiple carriers, e.g., LTE FDD/TDD, GSM/GERAN, CDMA2000, etc. For example, wireless communication system 200 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the user equipment. The term carrier aggregation (CA) is also called (e.g., interchangeably called) "multi-carrier system", "multi-cell operation", "multi-carrier operation", "multi-carrier" transmission and/or reception. Note that some embodiments are also applicable to Multi RAB (radio bearers) on some carriers (that is data plus speech is simultaneously scheduled).

Various embodiments described herein can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Figure 12:
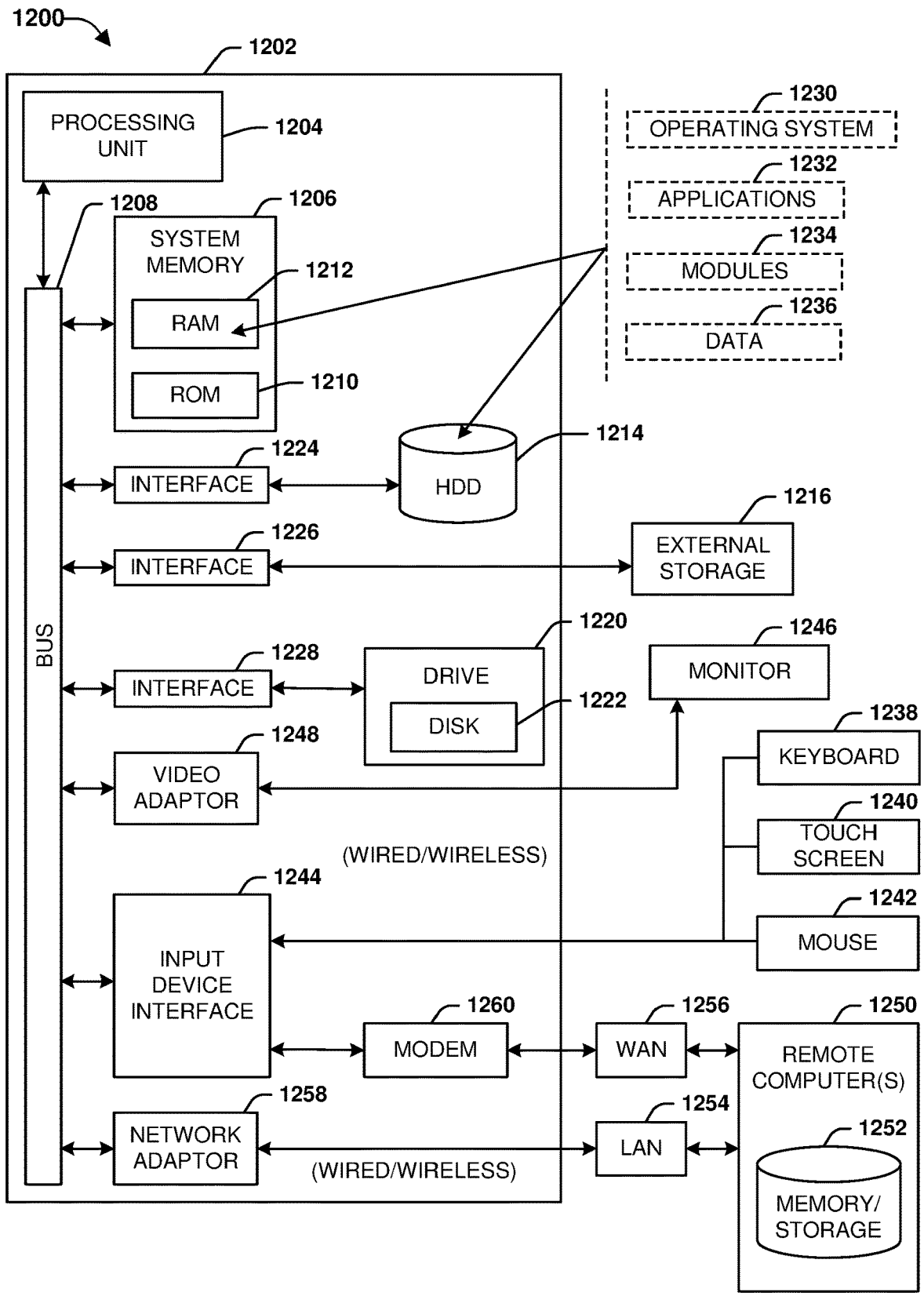
FIG. 12 provides additional context for various embodiments described herein, intended to provide a brief, general description of a suitable operating environment in which the various embodiments of the embodiment described herein can be implemented.

FIG. 12 can provide additional context for various embodiments described herein, intended to provide a brief, general description of a suitable operating environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms can be used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example operating environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and a drive 1220, e.g., such as a solid-state drive, an optical disk drive, which can read or write from a disk 1222, such as a CD-ROM disc, a DVD, a BD, etc. Alternatively, where a solid-state drive is involved, disk 1222 would not be included, unless separate. While the internal HDD 1214 is illustrated as located within the computer 1202, the internal HDD 1214 can also be configured for external use in a suitable chassis (not shown). Additionally, while not shown in environment 1200, a solid-state drive (SSD) could be used in addition to, or in place of, an HDD 1214. The HDD 1214, external storage device(s) 1216 and drive 1220 can be connected to the system bus 1208 by an HDD interface 1224, an external storage interface 1226 and a drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above, such as but not limited to a network virtual machine providing one or more aspects of storage or processing of information. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed.

While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further to the description above, as it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine-readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipment do not normally connect directly to the core networks of a large service provider, but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third-party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like can be used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used, or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be affected across a plurality of devices. Accordingly, the embodiments are not to be limited to any single implementation, but rather are to be construed in breadth, spirit and scope in accordance with the appended claims.

What is claimed is:

1. A method, comprising:
   facilitating, by a system comprising a processor, receiving a message from a user equipment, wherein the message comprises signal information describing a detection of a signal of a carrier of a base station equipment, and wherein the signal was detected while the user equipment was in an idle mode at a first location;
   identifying, by the system, a second location of the base station equipment corresponding to a time when the signal was transmitted, wherein the second location is different from the first location;
   based on the first location, the second location, and the signal information, estimating, by the system, a path loss of the carrier at the first location, wherein the path loss comprises a first downlink path loss; and
   estimating, by the system, an uplink path loss for the first location by comparing the first downlink path loss to a second downlink path loss measurement from the base station equipment at the first location, by a second user equipment that collected the second downlink path loss measurement during an active mode communications connection.

2. The method of claim 1, further comprising, based on the path loss, facilitating, by the system, reallocating an antenna resource of the base station equipment associated with the carrier.

3. The method of claim 1, wherein the carrier comprises a first carrier, and wherein the method further comprises, allocating an antenna resource to provide a second carrier for a coverage and capacity augmentation of the second location.

4. The method of claim 1, wherein the receiving the message comprises receiving a mobility management message with the signal information comprised in a signal information portion, and wherein the signal information portion was appended to the mobility management message by the user equipment.

5. The method of claim 4, wherein the user equipment was selected from a group of user equipment, and wherein the group of user equipment comprises a capability to append the signal information portion to the mobility management message.

6. The method of claim 4, wherein the receiving the mobility management message occurs after the user equipment transmitted the mobility management message, which was triggered based on:
   the user equipment having moved from a first tracking area comprising the first location to a different tracking area comprising a different location, or a collection time interval.

7. The method of claim 1, wherein the second downlink path loss measurement was received via a reference signal message from the second user equipment that was transmitted from the first location.

8. The method of claim 1, wherein the message further comprises device information corresponding to a power allocation setting of the user equipment at a time of the signal being detected by the user equipment, and wherein the estimating the path loss is further based on the power allocation setting.

9. The method of claim 1, wherein the signal information describes the signal of the carrier being detected from different locations over a time period, and wherein the signal information was collected and stored before the message was created.

10. The method of claim 1, wherein the message further comprises device information corresponding to a model of the user equipment, and wherein the estimating the path loss is further based on the model.

11. A non-transitory machine-readable medium, comprising executable instructions that, when executed by a processor of a controller device, facilitate performance of operations, the operations comprising:
    receiving a tracking area update from a user equipment, wherein the tracking area update comprises signal propagation information describing a detection of a carrier signal of a base station, wherein the carrier signal was detected while the user equipment was in an idle mode at a first location;

identifying a second location of the base station associated with a time that the carrier signal was transmitted, wherein the second location is different from the first location;

based on the first location, the second location, and the signal propagation information, estimating a path loss of the carrier signal at the first location, resulting in an estimated path loss, wherein the path loss comprises a first downlink path loss; and estimating an uplink path loss for the first location by comparing the first downlink path loss to a second downlink path loss measurement from the base station at the first location, by a second user equipment that collected the second downlink path loss measurement during an active mode communications connection.

12. The non-transitory machine-readable medium of claim 11, wherein the signal propagation information was received via extra information appended to respective idle status messages transmitted by selected ones of a group of idle user equipment.

13. The non-transitory machine-readable medium of claim 12, wherein the extra information comprises signal information describing a detection of the carrier signal from different locations over a time period, and wherein the signal propagation information was collected and stored before the tracking area update was created.

14. The non-transitory machine-readable medium of claim 12, wherein the tracking area update further comprises device information corresponding to a model of the user equipment, and wherein the estimating the path loss is further based on the model.

15. The non-transitory machine-readable medium of claim 11, wherein the time that the carrier signal was transmitted is a first time, wherein the tracking area update further comprises device information corresponding to a power allocation setting of the user equipment at a second time of the identifying of the carrier signal, and wherein the estimating the path loss is further based on the power allocation setting.

16. The non-transitory machine-readable medium of claim 11, wherein the operations further comprise:

based on the estimated path loss, altering a configuration of the base station to improve a network performance above a network performance threshold.

17. A system comprising:

a processor; and a memory that stores executable instructions that, when executed by the processor, facilitate performance of operations, the operations comprising:

facilitating receiving a message from a user equipment, wherein the message comprises signal information describing a detection of a signal of a carrier of a base station equipment, and wherein the signal was detected while the user equipment was in an idle mode at a first location;

identifying a second location of the base station equipment corresponding to a time when the signal was transmitted, wherein the second location is different from the first location;

based on the first location, the second location, and the signal information, estimating a path loss of the carrier at the first location, wherein the path loss comprises a first downlink path loss; and estimating an uplink path loss for the first location by comparing the first downlink path loss to a second downlink path loss measurement from the base station equipment at the first location, by a second user equipment that collected the second downlink path loss measurement during an active mode communications connection.

18. The system of claim 17, the operations further comprising, based on the path loss, facilitating reallocating an antenna resource of the base station equipment associated with the carrier.

19. The system of claim 17, wherein the carrier comprises a first carrier, and wherein the operations further comprise allocating an antenna resource to provide a second carrier for a coverage and capacity augmentation of the second location.

20. The system of claim 17, wherein the receiving the message comprises receiving a mobility management message with the signal information comprised in a signal information portion, and wherein the signal information portion was appended to the mobility management message by the user equipment.

* * * * *